(12) United States Patent
Nakata et al.

(10) Patent No.: US 10,788,338 B2
(45) Date of Patent: Sep. 29, 2020

(54) SEMICONDUCTOR DEVICE AND OPTICAL ENCODER COMPRISING A LIGHT SOURCE DRIVER TO DRIVE A LIGHT SOURCE BASED ON SIGNALS FROM AN INCIDENT LIGHT RECEIVED FIRST ELEMENT AND AN INCIDENT LIGHT SHIELDED SECOND ELEMENT

(71) Applicant: CANON KABUSHIKI KAISHA, Tokyo (JP)

(72) Inventors: Yasushi Nakata, Yokohama (JP); Kazutoshi Torashima, Yokohama (JP); Masanori Shibata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 16/237,891

(22) Filed: Jan. 2, 2019

(65) Prior Publication Data

US 2019/0226884 A1      Jul. 25, 2019

(30) Foreign Application Priority Data

Jan. 19, 2018   (JP) ................................ 2018-007590

(51) Int. Cl.
*G01D 5/347*    (2006.01)
*G01J 1/44*     (2006.01)
*G01D 5/244*    (2006.01)

(52) U.S. Cl.
CPC ..... *G01D 5/34715* (2013.01); *G01D 5/24428* (2013.01); *G01J 1/44* (2013.01); *G01D 5/34746* (2013.01); *G01J 2001/446* (2013.01)

(58) Field of Classification Search
CPC .. G01D 5/34715; G01J 1/44; G01J 2001/446; G01J 1/1626; G01J 1/32; G01S 7/497; H04N 13/254
USPC ................................ 250/205, 214 R, 231.13
See application file for complete search history.

(56) References Cited

U.S. PATENT DOCUMENTS

| 8,004,724 B2 * | 8/2011 | Sakamoto .............. H04N 1/484 250/208.1 |
| 8,081,366 B2 | 12/2011 | Torashima et al. |
| 2009/0034038 A1 | 2/2009 | Torashima et al. |

FOREIGN PATENT DOCUMENTS

JP        2005265512        9/2005

* cited by examiner

*Primary Examiner* — Que Tan Le
(74) *Attorney, Agent, or Firm* — Venable LLP (57) ABSTRACT

A semiconductor device comprising a plurality of photoelectric conversion elements arrayed on a substrate, a readout unit configured to read out signals from the plurality of photoelectric conversion elements, and a light source unit driver configured to drive a light source unit, wherein the plurality of photoelectric conversion elements include a first element configured to receive incident light and a second element configured to be shielded from the incident light, and the light source unit driver drives the light source based on both a signal from the first element and a signal from the second element read out by the readout unit.

17 Claims, 4 Drawing Sheets

SEMICONDUCTOR DEVICE AND OPTICAL ENCODER COMPRISING A LIGHT SOURCE DRIVER TO DRIVE A LIGHT SOURCE BASED ON SIGNALS FROM AN INCIDENT LIGHT RECEIVED FIRST ELEMENT AND AN INCIDENT LIGHT SHIELDED SECOND ELEMENT

BACKGROUND OF THE INVENTION

Field of the Invention

The present invention relates to a semiconductor device and an optical encoder.

Description of the Related Art

Among electronic devices that include a light source unit such as an optical encoder or the like, there is an electronic device that performs light power control to maintain a constant light emission amount in the light source unit. This kind of control is also referred to as APC (Automatic Power Control).

Japanese Patent Laid-Open No. 2005-265512 discloses an arrangement which includes a light source unit, a scale that reflects light from the light source unit, and a light receiving unit on which a plurality of light receiving elements (photoelectric conversion elements) that receive the reflected light from the scale are arranged. The above-described APC is performed based on the signals of the plurality of light receiving elements, and the light emission amount of the light source unit can be maintained to be constant.

In a case in which a plurality of light receiving elements are arrayed as in the arrangement disclosed in Japanese Patent Laid-Open No. 2005-265512, signal interference may occur between two adjacent light receiving elements, that is, a signal component may flow out from one light receiving element to the other light receiving element. This kind of a phenomenon, also referred to as crosstalk, can degrade the accuracy of the APC.

SUMMARY OF THE INVENTION

An object of the present invention is to provide a technique advantageous in improving the accuracy of APC.

One of the aspects of the present invention provides a semiconductor device comprising a plurality of photoelectric conversion elements arrayed on a substrate, a readout unit configured to read out signals from the plurality of photoelectric conversion elements, and a light source unit driver configured to drive a light source unit, wherein the plurality of photoelectric conversion elements include a first element configured to receive incident light and a second element configured to be shielded from the incident light, and the light source unit driver drives the light source based on both a signal from the first element and a signal from the second element read out by the readout unit.

Further features of the present invention will become apparent from the following description of exemplary embodiments with reference to the attached drawings.

DESCRIPTION OF THE EMBODIMENTS

Embodiments of the present invention will be described hereinafter with reference to the accompanying drawings. Note that each drawing is a schematic view showing a structure or an arrangement of an embodiment, and the dimensions of members shown in the drawing do not necessarily reflect actual practice. Note that the same reference numerals denote the same components throughout the drawings, and a description of overlapping contents will be omitted in this specification.

Figure 1:
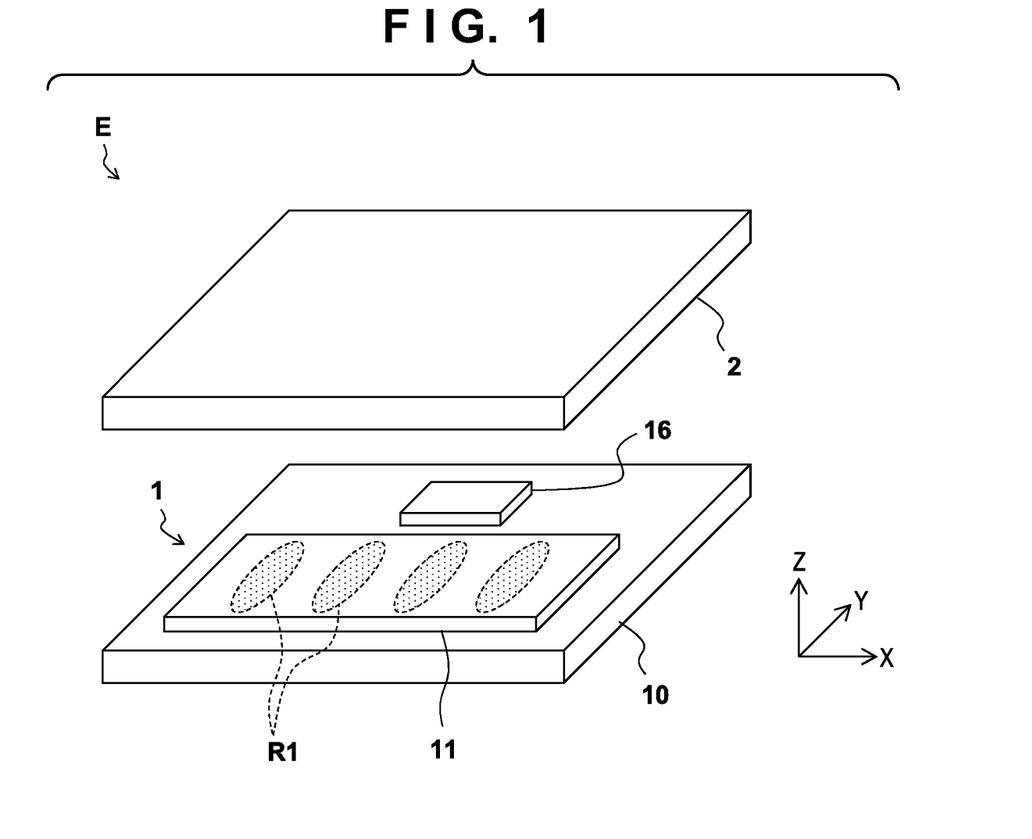
FIG. 1 is a view for explaining an example of the arrangement of an optical encoder.
Figure 2:
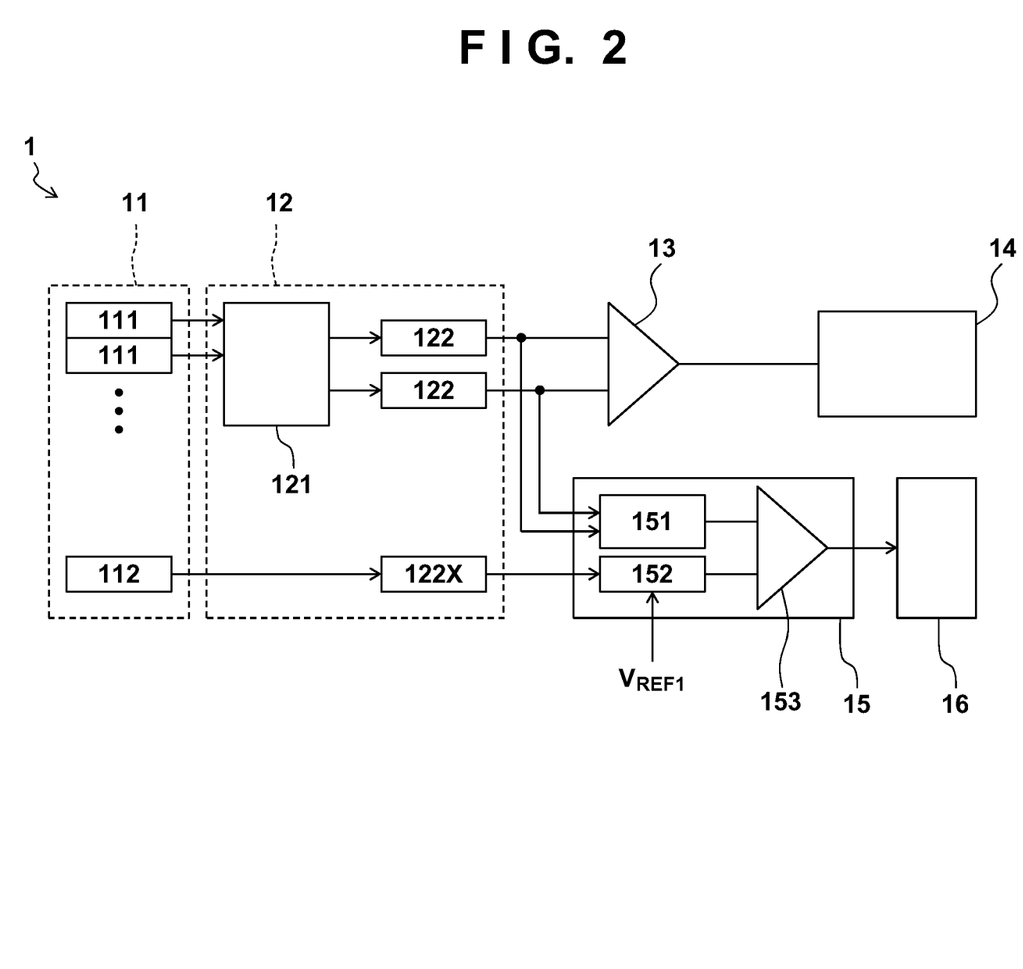
FIG. 2 is a block diagram for explaining an example of the arrangement of a light receiving unit.

FIG. 1 is a perspective view showing an example of the arrangement of an optical encoder E according to an embodiment. The optical encoder E according to this embodiment is a reflective encoder (reflective photoelectric linear encoder) and includes a semiconductor device (or a semiconductor apparatus) 1 as an encoder head or a sensor head and a light reflecting scale 2. FIG. 2 is a block diagram showing an example of the arrangement of the semiconductor device 1. The semiconductor device 1 includes a light receiving unit 11, a readout unit 12, a differential circuit unit 13, a processor 14, a light source unit driver 15, and a light source unit 16.

The light receiving unit 11 includes a plurality of photoelectric conversion elements 111 and a photoelectric conversion element 112. Although these elements will be described in detail later, assume that an element positioned at the farthest end in the array direction of is the photoelectric conversion element 112 and elements other than this are the photoelectric conversion elements 111. The position of the photoelectric conversion element 112 is not limited this, and it suffices to be a position that will not greatly impair the light receiving function of the light receiving unit 11. A known photodetector such as a photodiode or the like can be used as the photoelectric conversion elements 111 and 112. In this case, each photoelectric conversion element 111 (first element) is formed to be capable of receiving incident light and of outputting a current corresponding to the amount of charges generated by the incident light. On the other hand, each photoelectric conversion element 112 (second element) is formed so as to be shielded from the light traveling toward the photoelectric conversion element 112. For example, the light receiving surface, that is, the light detection surface of the photoelectric conversion element 112 is covered by a light shielding member such as a metal film.

The readout unit 12 can read out signals from the photoelectric conversion elements 111 and 112. In this embodiment, the readout unit 12 includes a selection unit 121, conversion units 122, and a conversion unit 122X. The selection unit 121 is formed from a known switch element such as a MOS transistor or the like, and selectively outputs the signals from the photoelectric conversion element 111 to the conversion units 122. The conversion unit 122 generates a voltage signal corresponding to the current amount (charge amount) of each photoelectric conversion element 111 selected by the selection unit 121. In this case, two conversion units 122 are shown, and the selection unit 121 will select two elements out of the plurality of photoelectric conversion elements 111 and will output their respective signals to the two corresponding conversion units 122. However, their quantities are not limited to this example. The conversion unit 122X is a current-to-voltage converter that has the same arrangement as that of the conversion unit 122, and generates a voltage signal corresponding to the current amount of the photoelectric conversion element 112. The readout unit 12 reads out each signal from the photoelectric conversion element 112 and selectively reads out signals from the plurality of photoelectric conversion element 111 according to such an arrangement.

Although details will be described later, the differential circuit unit 13 outputs, as a detection signal to the processor 14, a signal corresponding to the difference between the signals from the two conversion units 122 described above. This detection signal can also be referred to as a position signal, an encoder signal, or the like.

The light source unit driver 15 includes an adding unit 151, a correction unit 152, and a comparison unit 153, and drives the light source unit 16. The adding unit 151 adds the signals from the conversion unit 122 described above. Although details will be described later, the correction unit 152 receives a reference signal (reference voltage) $V_{REF1}$ that provides a reference value, receives a signal from the conversion unit 122X, and corrects the reference signal $V_{REF1}$ based on the signal from the conversion unit 122X. The comparison unit 153 receives a signal from the adding unit 151 and the signal from the correction unit 152 and outputs a current corresponding to their comparison result. The light source unit driver 15 executes APC (Automatic Power Control) by such an arrangement and controls the light source unit 16 so as to set a desired light emission amount. For example, if the signal from the adding unit 151 is larger than the signal from the correction unit 152, the light source unit driver 15 decreases the driving force of the light source unit 16, and if the signal from the adding unit 151 is smaller than the signal from the correction unit 152, the light source unit driver increases the driving force of the light source unit 16. An electronic component including an LED (Light Emitting Diode) element is used as the light source unit 16.

With reference again to FIG. 1, in the semiconductor device 1, the light receiving unit 11, the light source unit 16, the readout unit 12 (not shown here), and the like are arranged on a first substrate member 10. The plurality of photoelectric conversion elements 111 and 112 of light receiving unit 11 are arrayed along an X direction in FIG. 1. The light source unit 16 is arranged at a position shifted from the light receiving unit 11 in a +Y direction in FIG. 1, and the light source unit emits light to the scale 2 arranged above (position sifted in a +Z direction in FIG. 1) it. A reflecting portion arranged so as to be capable of reflecting light and a non-reflecting portion whose light reflectance is suppressed more than the reflecting portion are alternately arranged at a predetermined interval in the X direction on the lower surface (surface on the side of the light source unit 16) of the scale 2. As a result, the reflected light from the light reflecting scale 2 to the light receiving unit 11 forms a striped or wave-shaped light amount distribution. Each region with a comparatively large incident light amount is shown as a region R1 in FIG. 1, and a plurality of regions R1 according to this distribution will be formed regularly in the X direction. The semiconductor device 1 and the light reflecting scale 2 are capable of moving relatively with respect to each other in the X direction, and if one component moves relatively with respect to the other component, this light amount distribution will shift in the X direction.

In reference to FIG. 2 as well, the above-described light amount distribution of the reflected light from the scale 2 is detected by the light receiving unit 11, and this detection result is processed as a detection signal by the processor 14 via the readout unit 12 and the differential circuit unit 13. The processor 14 can obtain the relative positions of the semiconductor device 1 and the scale 2 and/or the relative movement amount of the semiconductor device and the scale based on the detection signal. Note that although the processor 14 is shown as a part of the semiconductor device 1 here, the processor 14 may be partially or entirely arranged outside the semiconductor device 1.

Figure 3:
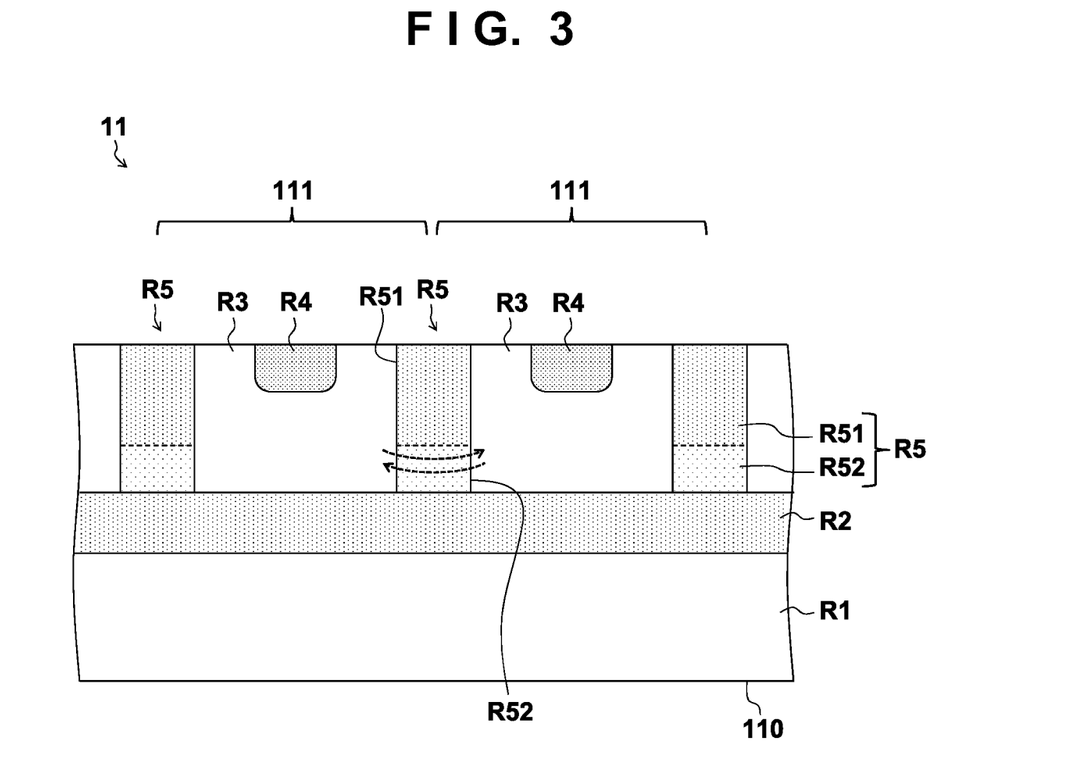
FIG. 3 is a view for explaining an example of a signal readout forms from the light receiving unit.

FIG. 3 shows a sectional view taken along an X-Z plane of FIG. 2 as a schematic view showing an example of the structure of the light receiving unit 11. FIG. 3 shows two photoelectric conversion elements 111 and their peripheral regions. The light receiving unit 11 is formed in a semiconductor substrate 110 by using a known semiconductor manufacturing process. In this embodiment, the semiconductor substrate 110 includes the region R1 formed in a comparatively deep region, a region R2 formed on the region R1 (in a position shallower than the region R1), regions R3 formed on the region R2, a region R4 formed in each region R3, and regions R5 partitioning the regions R3. Note that the expressions "deep/shallow" used above represent the magnitude relationship of the distance from the upper surface of the semiconductor substrate 110, and will be used in the same manner in the following description.

The region R1 is an n-type region, and the n-type impurity concentration of the region R1 is set to be comparatively low. The region R2 is an n-type region, and the n-type impurity concentration of the region R2 is set to be comparatively higher than that of the region R1. Each region R3 is an n-type region, and the n-type impurity concentration of the region R3 is set to be comparatively low (at least lower than that of the region R2). Each region R4 is a p-type region, and the p-type impurity concentration of the region R4 is set to be comparatively high so that an electrical connection with a wiring portion (not shown) will be implemented by an ohmic contact. Also, each region R5 is an n-type region, and the n-type impurity concentration of the region R5 is set to be higher than that of the region R3 so as to electrically separate and partition the regions R3.

According to the above-described structure, the regions R3 are partitioned by the regions R5, and the region R4 is formed in each of the partitioned regions R3, thereby forming each photoelectric conversion element 111. In other words, the region R5 is formed at each border portion between adjacent photoelectric conversion elements 111. A photodiode which is to serve as the photoelectric conversion element 111 is formed by a p-n junction between the region R3 and the region R4, charges (electron-hole pairs) are generated in accordance with the incident light in the region R3, and the minority carriers (holes) of the charges are collected in the region R4. Subsequently, the minority carriers are read out as a signal by the aforementioned readout unit 12.

The regions R3 to R5 are formed on the epitaxial growth layer in this embodiment, allowing the photoelectric conversion element 111 to be formed in a semiconductor region with good crystallinity. This epitaxial growth layer is formed to have a thickness of, for example, equal to or more than 2 μm, and preferably equal to or more than 4 μm and, for example, equal to or less than 15 μm, and preferably equal to or less than 10 μm. In this embodiment, although it is assumed that the regions R3 to R5 are formed at a depth that falls within a range of 0 μm to 15 μm from the surface of the semiconductor substrate 110, the regions R3 to R5 may be formed at a depth that falls within a range of 0 μm to 10 μm.

Here, as shown in FIG. 3, each region R5 includes a comparatively shallow region R51 positioned near the surface of the semiconductor substrate 110 and a region R52 positioned relatively deeper than the region R51 and shallower than the region R2. In general, a semiconductor region of a predetermined conductivity type tends to have a lower impurity concentration in a deep position than a shallow position since the impurity is implanted from above the semiconductor substrate 110. Hence, although details will be described later, the region R52 has a lower n-type impurity concentration than the region R51 in the region R5 described above.

When the conductivity type and the degree of impurity concentration of each of the above-described regions R1 and the like are explicitly expressed, they are as follows:

|  |  |
|---|---|
| Region R1 | $N^-$ |
| Region R2 | $N^{++}$ |
| Region R3 | $N^-$ |
| Region R4 | $P^{++}$ |
| Region R51 | $N^{++}$ |
| Region R52 | $N^+$ |

Note that the plus (+, ++) symbols indicate that the impurity concentration is comparatively high, and the minus (−) symbol indicates that the impurity concentration is comparatively low.

In summary, each photoelectric conversion element 111 includes the p-type (first conductivity type) region R4 (first semiconductor region), the n-type (second conductivity type) region R3 (second semiconductor region) formed in a position deeper than the region R4 so as to cover the bottom surface of the region R4, and the region R2 (third semiconductor region) formed in a position deeper than the region R3 and has a higher n-type impurity concentration than the region R3. In addition, between adjacent photoelectric conversion elements 111, there is formed the n-type region R5 (fourth semiconductor region) for electrically separating their respective regions R3. This region R5 includes the region R51 (first portion) formed in a position shallower than the region R2 and the region R52 (second portion) formed in a position shallower than the region R2 but deeper than the region R51. The n-type impurity concentration of the region R51 is higher than that of the region R3, and the n-type impurity concentration of the region R52 is higher than that of the region R3 and lower than that of the region R51.

Although the structure of each photoelectric conversion element 111 has been described with reference to FIG. 3 here, the photoelectric conversion element 112 (see FIG. 2) formed so as to be shielded from incident light includes the same structure as that of the above-described photoelectric conversion element 111 for the semiconductor substrate 110. A wiring structure (not shown) on which a wiring layer and an insulating layer are stacked is arranged on the semiconductor substrate 110, and immediately above the photoelectric conversion element 112, a light shielding member such as a metal film is arranged in this wiring structure. The reflected light from the scale 2 will be shielded by this light shielding member.

Figure 4A:
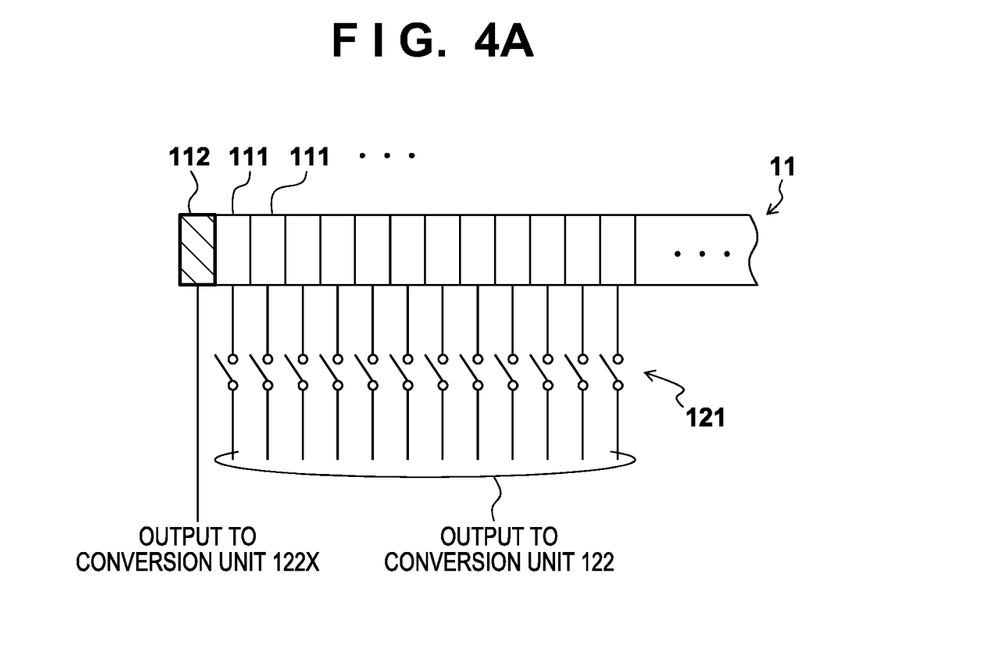
FIGS. 4A and 4B are views for explaining the signal readout forms from the light receiving unit.

FIG. 4A is a simple circuit diagram for explaining the signal readout form of the light receiving unit 11. As has been described with reference to FIGS. 1 and 2, the light receiving unit 11 includes the plurality of photoelectric conversion elements 111 and 112, and the photoelectric conversion element 112 is positioned at the farthest end in the array direction in this embodiment. The plurality of photoelectric conversion element 111 are selectively connected to the conversion units 122 by the selection unit 121, and for the sake of descriptive convenience, a plurality of switch elements arranged in correspondence with the plurality of photoelectric conversion elements 111 will be shown as the selection unit 121 in FIG. 4A.

In this specification, for the sake of discrimination, the photoelectric conversion element 111 corresponding to a switch element in an ON state (conductive state) will be expressed as a "selected element", and the photoelectric conversion element 111 corresponding to a switch element in an OFF state (non-conductive state) will be expressed as a "non-selected element". That is, the photoelectric conversion element 111 that is set to a selected state by the selection unit 121 will be referred to as a selected element, and each photoelectric conversion element other than that will be referred to as a non-selected element.

In this embodiment, the photoelectric conversion element 112 is connected to the conversion unit 122X and can obtain the temporal variation of the signal of the photoelectric conversion element 112. As another embodiment, it may be arranged so that the photoelectric conversion element 112 is connected to the conversion unit 122X via a switch element in the same manner as the photoelectric conversion element 111, and the signal of the photoelectric conversion element 112 is read out as needed. In FIG. 4A, the photoelectric conversion element 112 is indicated by stripes.

Figure 4B:
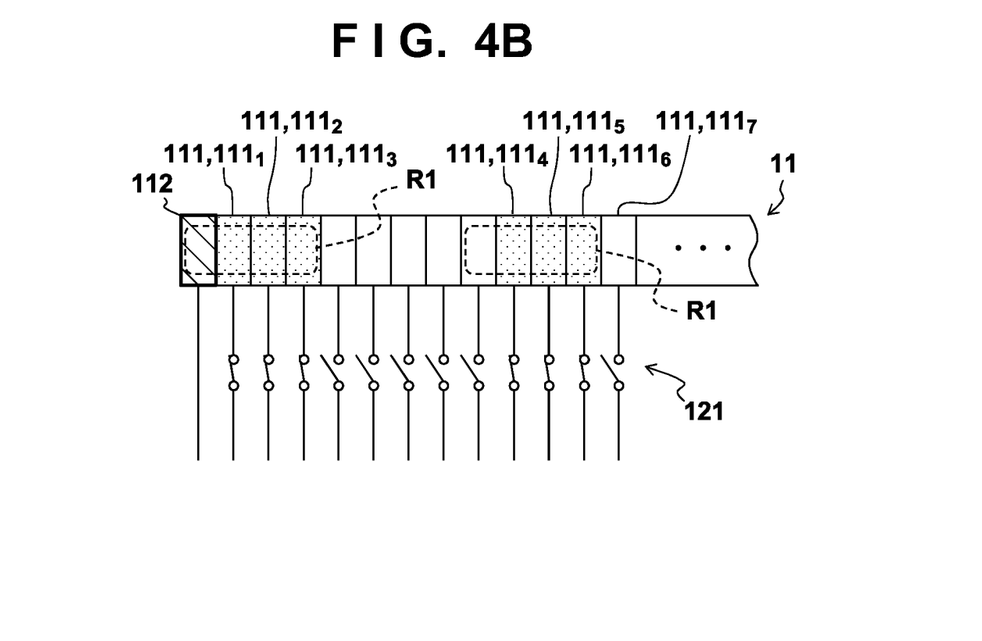

FIG. 4B shows, in the same manner as FIG. 4A, an example of the signal readout form of the light receiving unit 11. In FIG. 4B, each selected element (the photoelectric conversion element corresponding to a switch element in the ON state) 111 is indicated by dots. In this case, as one example, an operation is shown in which signals are read out from one set of three continuously arrayed selected elements $111_1$ to $111_3$ and another set of three selected elements $111_4$ to $111_6$ which are continuously arrayed in a position spaced apart from the preceding set of selected elements. In this manner, arbitrary elements of the plurality of photoelectric conversion elements 111 are selectively connected to the corresponding conversion units 122 by the selection unit 121. In addition, FIG. 4B shows the region R1 (see FIG. 1) as a region in which the amount of light reflected from the scale 2, that is, the amount of incident light to the light receiving unit 11 is comparatively large.

Referring again to FIG. 3, it can be seen that, as indicated by broken-line arrows, the charges generated in the region R3 of one photoelectric conversion element 111 may flow out (leak) to the region R3 of its adjacent photoelectric conversion element 111 through the region R52 which has a comparatively low n-type impurity concentration. Hence, signal interference can be generated between adjacent photoelectric conversion elements 111 due to this outflow of charges. This phenomenon can significantly appear when a beam of light with a comparatively long wavelength such as infrared light (wavelength of about 780 nm to 1,000 nm) enters since the entry depth of this light beam to the semiconductor substrate 110 can be large. This phenomenon, which is also referred to as crosstalk, can degrade the accuracy of the aforementioned APC since a component due to this crosstalk can mix into the signal that the light source unit driver 15 receives from the readout unit 12.

As an example, a description will be given by focusing on the rightmost-side element of the three continuously arrayed selected elements $111_4$ to $111_6$ in FIG. 4B, that is, the selected element $111_6$. The selected element $111_6$ receives, as shown by the region R1 in FIG. 4B, a comparatively large amount of incident light, but some of the charges generated from this may flow out to a non-selected element $111_7$ which is positioned on the right side of the selected element $111_6$. Thus, the signal value which is read out from the selected element $111_6$ by the readout unit 12 may become different from that which is supposed to be read out originally.

In this embodiment, as is apparent from FIG. 4B, the photoelectric conversion element 112 which is shielded from the incident light is next to the photoelectric conversion element 111 ($111_1$ in FIG. 4B) which can receive the incident light. Hence, there is a possibility that some of the charges generated in accordance with the incident light in this photoelectric conversion element 111 will flow out to the photoelectric conversion element 112.

On the other hand, since light will not substantially enter the photoelectric conversion element 112, charges due to heat noise or the like can be generated in the photoelectric conversion element 112. The current caused by such charges is also referred to as a dark current. Since this charge amount (alternatively, the dark current) is comparatively small, it can be assumed that there is no substantial outflow of charges from the photoelectric conversion element 112 to the photoelectric conversion element 111.

Therefore, the signal of the photoelectric conversion element 112 is read out by the readout unit 12 in a form in which a component (crosstalk component) corresponding to the amount of charges that flowed out from the photoelectric conversion element 111 to the photoelectric conversion element 112 is superimposed on a current component (dark current component) caused by a dark current in the photoelectric conversion element 112. Since the dark current component is comparatively small, it can be said that the signal read out from the photoelectric conversion element 112 substantially corresponds to the crosstalk component that flowed out from one to the other between the two adjacent photoelectric conversion elements.

The light source unit driver 15 executes APC in consideration of this above-described crosstalk based on the signal read out from this photoelectric conversion element 112. More specifically, the light source unit driver 15 causes the correction unit 152 to correct the reference signal $V_{REF1}$ based on the signal of the photoelectric conversion element 112 and drives the light source unit 16 so that the signal value of the adding unit 151 will approach the corrected reference signal (to be denoted as $V_{REF1}'$).

In other words, the light source unit driver 15 will execute APC by setting the corrected reference signal $V_{REF1}'$ described above as the target value to be satisfied by the light emission amount of the light source unit 16. In this point of view, the correction unit 152 functions as a target value generation unit that generates a target value of the light emission amount of the light source unit 16 based on the reference signal $V_{REF1}$ and the signal of the photoelectric conversion element 112.

The signal of the adding unit 151 varies depending on the selection form of the plurality of photoelectric conversion elements 111 by selection unit 121. For example, in the example of FIG. 4B, of the three continuously arrayed selected elements $111_4$ to $111_6$, with respect to the selected element $111_5$ in the middle, while a state in which charges flow out from the selected element $111_5$ to its two adjacent selected elements $111_4$ and $111_6$ can be considered on the one hand, a state in which charges flow in to the selected element $111_5$ from the two adjacent selected elements $111_4$ and $111_6$ can also be considered. The adding unit 151 adds the signals from these selected elements $111_4$ to $111_6$. Hence, it can be said that there is no substantial need to consider the influence of crosstalk on the signal obtained from the selected element $111_5$ in the middle.

On the other hand, with respect to the selected elements $111_4$ and $111_6$, there is a possibility that a signal component which is to be read out originally can become partially lost due to the outflow of charges or a signal component which is not to be read out originally will become mixed due to the inflow of charges that can be generated between with each of their respective adjacent non-selected elements 111. That is, there is a need to consider the influence of crosstalk on the signals that are obtained from these two selected elements $111_4$ and $111_6$.

Hence, it is preferable for the light source unit driver 15 to drive the light source unit 16 further based on, in addition to the signal value of each photoelectric conversion element 111 and the signal value of the photoelectric conversion element 112, the number of locations at which the photoelectric conversion element 111 and the non-selected element 111 are adjacent to each other. That is, the corrected reference signal $V_{REF1}'$ described above can be generated based on what form the photoelectric conversion element 111 has been selected. As an example, the corrected reference signal $V_{REF1}'$ described above can be generated by $$V_{REF1}' = V_{REF1} - (K \times V_{112} \times N)$$

$V_{112}$: the signal value of the photoelectric conversion element 112 (output value of the conversion unit 122X)
N: the number of locations at which the selected element and the non-selected element are adjacent to each other
K: coefficient As described above, the signal from the photoelectric conversion element 112 is used in the correction operation described above as a signal corresponding to the crosstalk component that flows out from one to the other between the adjacent photoelectric conversion elements 111. Hence, to improve the accuracy of the correction operation described above, it is preferable to provide the photoelectric conversion element 112 with the same arrangement (for example, the same upper surface layout) as each photoelectric conversion element 111. For example, the photoelectric conversion elements 111 and the photoelectric conversion element 112 may be arranged so as to have predetermined symmetry in a planar view, and preferably have translational symmetry.

Also, in order to allow the above-described crosstalk component to be specified with high accuracy based on the signal of the photoelectric conversion element 112, the area in which the photoelectric conversion elements 111 and 112 are adjacent to each other may be increased. That is, each of the photoelectric conversion elements 111 and 112 has a rectangular shape having long sides and short sides in a planar view, and the photoelectric conversion elements may be adjacent to each other on their respective long sides. As a result, the crosstalk component becomes more dominant than the aforementioned dark component due to an increase in the amount of charges that flow out from the photoelectric conversion element 111 to the photoelectric conversion element 112, and the accuracy of the correction operation described above can be further improved.

The crosstalk amount depends on the amount of incident light, that is, the amount of charges that flow out from one to the other between the adjacent photoelectric conversion elements 111 can change depending on the amount of incident light the one of the adjacent photoelectric conversion elements 111. Hence, by obtaining the temporal variation of the signal from the photoelectric conversion element 112 by the readout unit 12, the correction unit 152 can perform a correction operation based on the obtained result. For example, the correction unit 152 can correct the reference signal $V_{REF1}$ based on an integrated value, a maximum value, an average, a median, or the like of the signal of the photoelectric conversion element 112. In this embodiment, since the light amount distribution of the light receiving unit 11 shifts in accordance with the relative movement of the semiconductor device 1 and the scale 2, it is preferable for the correction unit 152 to correct the reference signal $V_{REF1}$ based on the integrated value (the accumulated value in a predetermined period) of the signals from the photoelectric conversion element 112.

As another embodiment, the correction unit 152 may correct the signal from the adding unit 151 instead of correcting the reference signal $V_{REF1}$. In this case, the correction unit 152 performs the correction operation by receiving the signal from the adding unit 151 and the signal from the conversion unit 122X and outputs the result to the comparison unit 153. The comparison unit 153 receives the signal from the correction unit 152 and the reference signal $V_{REF1}$ (signal which has not been corrected) and outputs a current corresponding to the comparison result. It is also possible to improve the accuracy of APC by this kind of arrangement.

The signal value of the photoelectric conversion element 112 may be associated with the signal value of the photoelectric conversion element 111 by incidentally obtaining, in advance (for example, before the start of APC, during the inspection process at the time of manufacture, or the like), the signals of the photoelectric conversion element 112 and its adjacent photoelectric conversion element 111. That is, the information indicating the correlation (what the signal value of the photoelectric conversion element 112 will be when the signal of the photoelectric conversion element 111 is a certain value) between the amount of incident light and the crosstalk amount is obtained in advance. This can further raise the accuracy of the correction operation described above.

As described above, according to this embodiment, the light source unit driver 15 can execute APC by driving the light source unit 16 based on both the signal of each photoelectric conversion element 111 and the photoelectric conversion element 112. Since the signal of the photoelectric conversion element 112 corresponds to the crosstalk component transmitted from one element to the other between the adjacent elements 111, the target value of the light emission amount of the light source unit 16 can be suitably set at the execution of APC. The light source unit driver 15 can highly accurately execute APC by controlling the light source unit 16 so that the signal value of the adding unit 151 will approach this target value.

As described above, a crosstalk significantly appears when a beam of light with a comparatively long wavelength such as, for example, infrared light (wavelength of about 780 nm to 1,000 nm) enters. Hence, according to this embodiment, the accuracy of the above-described APC can be effectively improved in an arrangement in which the light source unit 16 generates red light. Note that, although it is possible to increase the impurity concentration of the region R52 by additionally performing deep impurity implantation by increasing the implantation energy and the dose in order to suppress the crosstalk, the accuracy of the APC can be improved without performing such a process according to this embodiment. Therefore, according to this embodiment, it is also advantageous in reducing the manufacturing cost.

Although the embodiment and several preferred examples accompanying the embodiment have been described above, the present invention is not limited to them. Various kinds of modifications and changes can be made without departing form the scope of the present inventions.

The present invention is, for example, applicable to a transmissive encoder other than the reflective encoder according to this embodiment. In the case of a reflective encoder, the light source unit 16 is arranged (see FIGS. 1 and 2) on the common substrate member 10 together with the light receiving unit 11, the readout unit 12, the differential circuit unit 13, and the light source unit driver 15, and they are commonly packaged. On the other hand, in the case of a transmissive encoder, another substrate member (second substrate member) different from the substrate member 10 is prepared, and the light source unit 16 is arranged on the other substrate member. In this case, the two substrate members are arranged so as to face each other, and a light shielding scale on which portions to transmit the light from the light source unit 16 to the light receiving unit 11 and portions that shields the light are alternately arranged can be arranged between these two substrate members.

Furthermore, although an optical encoder was exemplified in the embodiment, the present invention is applicable to various kinds of electronic devices such as a light source device (for example, a laser) that includes a predetermined light source unit, a control device (for example, a laser driver) that executes APC on the light source unit, and the like.

The individual terms described in this specification are not limited to the ones used for the purpose of the description of the present invention. In the present invention, the terms need not be limited to the strict meanings of the terms but can include their equivalents.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-007590, filed on Jan. 19, 2018, which is hereby incorporated by reference herein in its entirety.

What is claimed is:

1. A semiconductor device comprising:
   a plurality of photoelectric conversion elements arrayed on a substrate;
   a readout unit configured to read out signals from the plurality of photoelectric conversion elements; and
   a light source unit driver configured to drive a light source unit,
   wherein the plurality of photoelectric conversion elements include
      a first element configured to receive incident light and
      a second element configured to be shielded from the incident light, and
   the light source unit driver drives the light source based on both a signal from the first element and a signal from the second element read out by the readout unit.

2. The device according to claim 1, wherein the light source unit driver corrects a predetermined reference value based on the signal from the second element, and drives the light source unit so that a value of the signal from the first element will approach the reference value.

3. The device according to claim 1, wherein the second element is, among the plurality of photoelectric conversion elements, a photoelectric conversion element positioned at a farthest end in an array direction.

4. The device according to claim 1, further comprising:
wherein the light source unit is arranged on a common substrate member together with the plurality of photoelectric conversion elements, the readout unit, and the light source unit driver.

5. The device according to claim 1, further comprising:
a first substrate member on which the plurality of photoelectric conversion elements, the readout unit, and the light source unit driver are arranged; and
a second substrate member on which the light source unit is arranged,
wherein the first substrate member and the second substrate member are arranged so as to face each other.

6. The device according to claim 1, wherein the first element comprises a plurality of first elements,
the plurality of photoelectric conversion elements comprise the plurality of first elements,
the readout unit selects some of the plurality of first elements and reads out the some of the signals together with the signal from the second element, and
in a case in which a selected first element among the plurality of first elements is set as the selected element and an element other than the selected element is set as a non-selected element,
the light source unit driver drives the light source unit based on
a value of the signal from the second element,
a value of the signal from the selected element, and
a number of locations at which the selected element and the non-selected element are adjacent to each to other.

7. The device according to claim 1, wherein the first element and the second element are arranged adjacent to each other so as to have symmetry in a planar view.

8. The device according to claim 1, wherein each of the plurality of photoelectric conversion elements is formed to have a rectangular shape so as to include long sides and short sides in a planar view, and the first element and the second element are arranged so as to be adjacent to each other on their respective long sides.

9. The device according to claim 1, wherein the light source unit generates infrared light.

10. The device according to claim 1, wherein each of the plurality of photoelectric conversion elements comprises a first semiconductor region of a first conductivity type formed on the substrate, and
the substrate comprises
a second semiconductor region of a second conductivity type formed, in a section of the substrate, in a position deeper than the first semiconductor region so as to cover a bottom surface of the first semiconductor region, and
a third semiconductor region of the second conductivity type formed, in the section of the substrate, in a position deeper than the second semiconductor region, the third semiconductor region having a higher impurity concentration of the second conductivity type than the second semiconductor region.

11. The device according to claim 10, wherein the second semiconductor region is formed at a depth that falls within a range of 0 μm to 15 μm.

12. The device according to claim 10, wherein a fourth semiconductor region of the second conductivity type is formed, in the section, between the first semiconductor regions of the photoelectric conversion elements which are adjacent to each other, and
the fourth semiconductor region comprises
a first portion of the second conductivity type formed in a position shallower than the third semiconductor region, the first portion having a higher impurity concentration of the second conductivity type than the second semiconductor region, and
a second portion of the second conductivity type formed in a position shallower than the third semiconductor region but deeper than the first portion, the second portion having a higher impurity concentration of the second conductivity type than the second semiconductor region and having a lower impurity concentration of the second conductivity type than the first portion.

13. The device according to claim 1, wherein other than being output to the light source unit driver, the signal from the first element is output as a detection signal to a processor, and
the signal from the second element is output to the light source unit driver among the light source unit driver and the processor.

14. The device according to claim 1, wherein the second element outputs a signal corresponding to an amount of incident light to the first element positioned next to the second element.

15. The device according to claim 1, wherein the plurality of photoelectric conversion elements comprise a plurality of the first elements, and
the light source unit driver comprises an adding unit configured to add signals from the plurality of first elements.

16. The device according to claim 1, wherein the light source unit driver drives the light source unit based on one of an integrated value of the signals from the second element and temporal variation of the signal from the second element.

17. An optical encoder comprising:
the semiconductor device according to claim 1.

* * * * *